Patented Jan. 28, 1941

2,230,198

UNITED STATES PATENT OFFICE 2,230,198

LACQUER RAW MATERIAL

Alfred Dierichs and Leo Rosenthal, Leverkusen-Wiesdorf, Germany, assignors to I. G. Farbenindustrie Aktiengesellschaft, Frankfort-on-the-Main, Germany No Drawing. Application December 27, 1937, Serial No. 182,004. In Germany January 6, 1937

3 Claims. (Cl. 134—26)

This invention relates to a new process for the manufacture of lacquer raw materials from fossil resins.

Prior to practical use for the manufacture of lacquers fossil resins are usually subjected to a melting process in order to convert them into a soluble form. In this process a considerable loss is caused by the formation of liquid or gaseous cleavage products. Moreover, the hitherto used methods yield dark products mostly of high acid numbers. The high acid number involves certain disadvantages chief among which lies in the fact that the oil lacquers prepared from these products have a tendency to thicken when ground with basic pigments.

It is the object of our present invention to overcome these disadvantages and to develop a new process which allows one to convert fossil resins in a simple and convenient manner into light colored lacquer raw materials of a low acid number. With these and other objects in view our invention consists in heating the fossil resins in the presence of tetrahydronaphthalene and an aliphatic alcohol (this term including araliphatic alcohols). The treatment with the aliphatic alcohol can be effected simultaneously with or subsequently to the heating with the indifferent solvent. As examples for fossil resins Kauri-copal, Congo-copal and amber may be mentioned. Suitable alcohols are glycerol, glycol, 1.3-butyleneglycol, benzyl alcohol and heptyl alcohol. Alcohols the excess of which can be easily removed by distillation are preferred, and among those the polyvalent alcohols. The simultaneous or subsequent treatment with such aliphatic alcohols effects a considerable lowering of the acid number. The tetrahydronaphthalene as well as the alcohols mentioned above are preferably so chosen that they are not materially decomposed at the melting tmeperature and can be easily removed by distillation when the reaction is finished.

The temperature of reaction is kept near the melting temperature of the fossil resin employed. A somewhat lower temperature (about 30 to 40° C. lower) is preferred in order to avoid decoloration. A super pressure will have to be employed only in case low boiling solvents or alcohols are present.

The following example illustrates the invention without, however, restricting it thereto, the parts being by weight:

Example 500 parts of ground amber are heated in a rotating autoclave with 1250 parts of tetrahydronaphthalene to a temperature of 365° C. and kept at this temperature for one hour. When the temperature has dropped to 300° C., 200 parts of ethylene glycol or 250 parts of butylene glycol are forced in under pressure; the temperature is kept at this point for about 2 hours. After cooling, the reaction solution is clarified with fuller's earth and the solvent is removed by distillation. A light-colored resin of the acid number 7 is obtained, whereas without an after-treatment with alcohol the resin exhibits the acid number 45.

We claim:

1. A process for the manufacture of a lacquer raw material from a fossil resin which comprises heating the resin with tetrahydronaphthalene and an aliphatic alcohol up to a temperature near the melting temperature of the resin.

2. The process as claimed in claim 1 wherein the temperature is kept about 30 to 40° C. lower than the melting temperature of the fossil resin.

3. The process as claimed in claim 1 wherein a polyvalent alcohol is employed.

ALFRED DIERICHS.
LEO ROSENTHAL.